United States Patent
Hellgren et al.

(10) Patent No.: US 12,399,511 B2
(45) Date of Patent: Aug. 26, 2025

(54) METHOD AND SYSTEM FOR CONTROLLING A PLURALITY OF VEHICLES, IN PARTICULAR AUTONOMOUS VEHICLES

(71) Applicant: VOLVO AUTONOMOUS SOLUTIONS AB, Gothenburg (SE)

(72) Inventors: Jonas Hellgren, Gothenburg (SE); Abdullah Mamun, Gothenburg (SE)

(73) Assignee: Volvo Autonomous Solutions AB, Gothenburg (SE)

(*) Notice: Subject to any disclaimer, the term of this patent is extended or adjusted under 35 U.S.C. 154(b) by 191 days.

(21) Appl. No.: 17/652,008

(22) Filed: Feb. 22, 2022

(65) Prior Publication Data

US 2022/0308594 A1  Sep. 29, 2022

(30) Foreign Application Priority Data

Mar. 23, 2021 (EP) .................................. 21164136

(51) Int. Cl.
G05D 1/69 (2024.01)
G01C 21/34 (2006.01)
G05D 1/242 (2024.01)

(52) U.S. Cl.
CPC ........... G05D 1/69 (2024.01); G01C 21/3407 (2013.01); G05D 1/2424 (2024.01)

(58) Field of Classification Search
None
See application file for complete search history.

(56) References Cited

U.S. PATENT DOCUMENTS

| | | | |
|---|---|---|---|
| 10,168,674 B1 | 1/2019 | Buerger et al. | |
| 11,243,540 B2 * | 2/2022 | Gupta | G05D 1/0212 |
| 11,537,134 B1 * | 12/2022 | Wiest | G06N 3/0455 |
| 2014/0046585 A1 * | 2/2014 | Morris, IV | G06Q 10/047 701/400 |
| 2014/0081506 A1 * | 3/2014 | Pack | G05D 1/0088 701/27 |
| 2016/0300186 A1 | 10/2016 | Scharaswak et al. | |
| 2017/0300049 A1 | 10/2017 | Seally | |
| 2018/0259976 A1 * | 9/2018 | Williams | G05D 1/223 |

(Continued)

OTHER PUBLICATIONS

European Search Report dated Aug. 31, 2021 in corresponding European Patent Application No. 21164136.0, 9 pages.

(Continued)

*Primary Examiner* — Vivek D Koppikar
*Assistant Examiner* — David Ruben Pedersen
(74) *Attorney, Agent, or Firm* — Venable LLP; Jeffri A. Kaminski

(57) ABSTRACT

There is provided a method for controlling a plurality of vehicles sharing a set of common resources Each vehicle's motion is controllable by a finite set of predefined commands. The method includes forming subsets of the common resources on the basis of predefined motion constraints of individual ones of the vehicles; partitioning the vehicles into disjoint clusters on the basis of the subsets; executing a tree-based planning algorithm. Each execution including an evaluation of sequences of the predefined commands to be fed to the vehicles in a single cluster and a selection of a preferred sequence of the commands; and feeding the preferred sequence of commands to the vehicles in each cluster.

14 Claims, 4 Drawing Sheets

(56) References Cited

U.S. PATENT DOCUMENTS

| | | |
|---|---|---|
| 2020/0247611 A1 | 8/2020 | Sharp et al. |
| 2021/0024100 A1 | 1/2021 | Calleija et al. |
| 2022/0276066 A1* | 9/2022 | Beaurepaire ....... G01C 21/3492 |

OTHER PUBLICATIONS

Bast Hannah et al: "Route Planning in Transportation Networks—Technical Report MSR-TR-2014-4", Microsoft Internet Article, Jan. 8, 2014 (Jan. 8, 2014), XP093214205, DOI: 10.1007/978-3-319-49487-6_2 Retrieved from the Internet: URL:https://www.microsoft.com/en-us/research/wp-content/uploads/2014/01 /MSRTR-2014-4.pdf.

European Communication pursuant to Article 94(3) EPC dated Oct. 18, 2024 in corresponding European Patent Application No. 21164136.0, 10 pages.

* cited by examiner

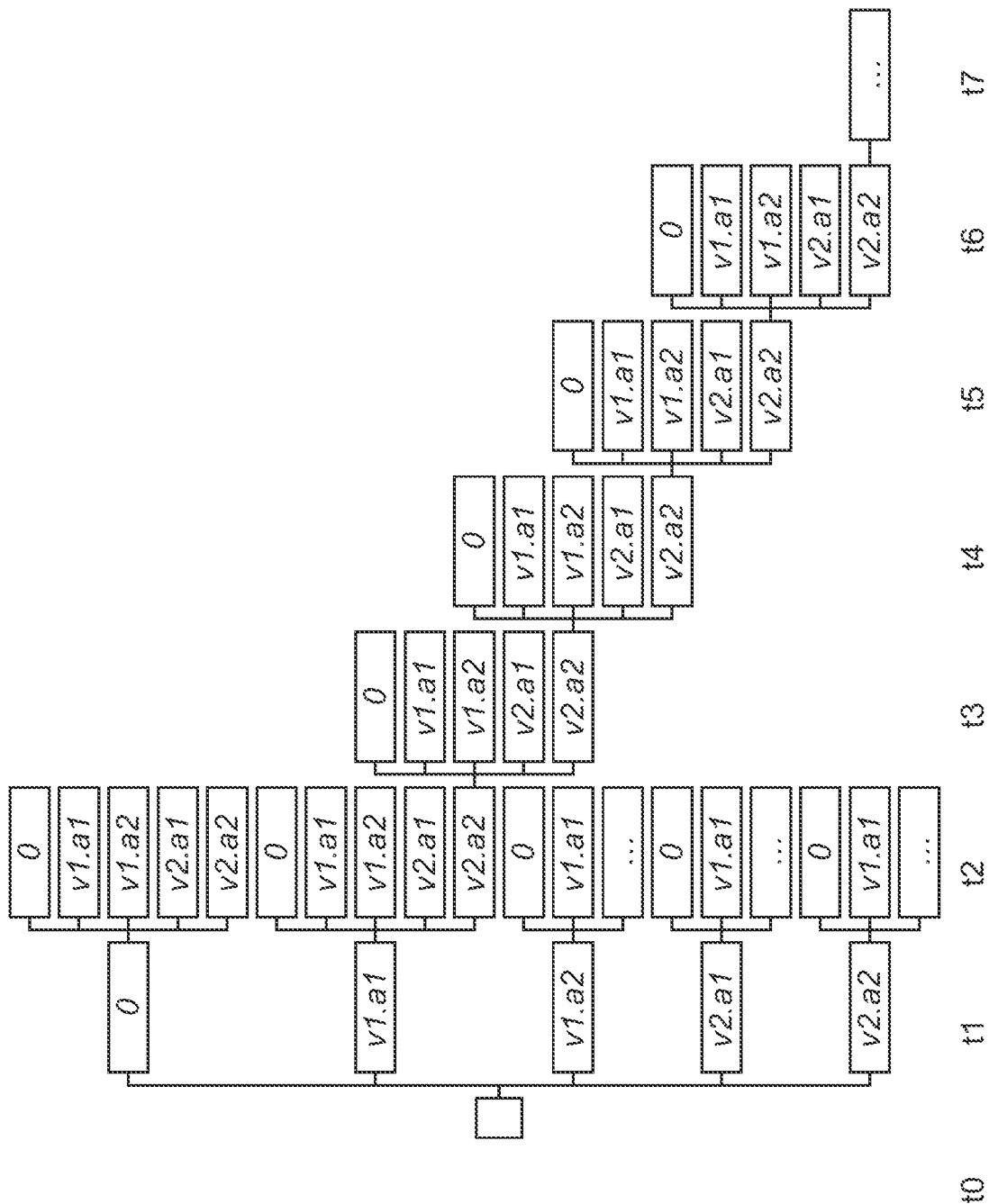

METHOD AND SYSTEM FOR CONTROLLING A PLURALITY OF VEHICLES, IN PARTICULAR AUTONOMOUS VEHICLES

TECHNICAL FIELD

The present disclosure relates to the field of centralized vehicle control, and in particular to methods and devices allowing centralized control of a scalable number of vehicles.

BACKGROUND

Motion planning for multiple vehicles is discussed in US20200247611A1, which discloses an object-handling coordination system with a plurality of transporting vessels arranged as a three-dimensional cluster. Motion planning is performed by evaluating possible future states, where each state corresponds to the contemporaneous positions of all transporting vessels. To make the planning task more tractable, it is proposed in US20200247611A1 to subdivide the cluster into spatial regions and perform the motion planning separately for each region. At the time of initiating a new planning cycle, therefore, the transporting vessels which are currently present in a region are considered together. In the next planning cycle, some of the transporting vessels may have relocated into a neighboring region and will be considered in the context of the neighboring region's transporting vessels. The fact that each transporting vessel may belong to different regions at different times requires extensive bookkeeping. The partitioning strategy according to US20200247611A1 also lacks inherent load balancing. Indeed, if transporting vessels accumulate temporarily in one region, the motion planning for that region may delay all others.

SUMMARY

One objective of the present disclosure is to make available a method for controlling a number of vehicles that share a set of resources, where each vehicle's motion is controllable by a finite set of commands. It is a particular objective to make available a control method that is suitable for tactical decision-making about the motion of the vehicles. It is a further objective to make available a control method that is scalable in the sense of remaining computationally tractable when the number of vehicles varies. It is a still further objective to propose a control method that allows load balancing and/or parallelization. The present disclosure also aims to provide devices and software with such characteristics.

At least some of these objectives are achieved by the invention as defined by the independent claims. The dependent claims relate to embodiments of the invention.

In a first aspect of the invention, there is provided a method for controlling a plurality of vehicles sharing a set of common resources, wherein each vehicle's motion is controllable by a finite set of predefined commands. The method comprises: forming subsets of the common resources on the basis of predefined motion constraints of individual ones of the vehicles and then partitioning (or segmenting) the vehicles into disjoint clusters on the basis of said subsets. When the partition is in place, multiple executions of a tree-based planning algorithm are initiated, wherein each execution includes an evaluation of sequences of the predefined commands to be fed to the vehicles in a single cluster and a selection of a preferred sequence of the commands. The resulting preferred sequence of commands may then be fed, directly or via an intermediary entity, to the vehicles in each cluster.

The inventors have realized that the fan-out of search trees of the type used in tree-based planning algorithms is directly related to the number of vehicles in a cluster. The size of the search space (which may correspond to the number of leaves of the tree) for a given search depth d is therefore proportional to the $d^{th}$ power of a number which grows at least linearly with the number of vehicles. The partitioning of the vehicles into disjoint clusters therefore reduces the necessary computational effort significantly. The inventors have realized, furthermore, that the partitioning should preferably be such that the vehicles interact or interfere across the clusters only to a limited extent. To achieve this, two or more subsets of the common resources are formed on the basis of predefined motion constraints of the vehicles, and those subsets guide the partitioning. Certainly, the fact that the resource subsets—unlike the vehicle clusters—are allowed to overlap (intersect) creates a need to coordinate the utilization of some resources specifically, yet this added cost is acceptable in view of the considerable gain achieved by the ability to split the planning into multiple executions with fewer vehicles in each. It is possible to implement the first aspect in a robust and efficient way, since a vehicle's membership of a cluster does not change as a result of the vehicle's motion. As will be explained below, furthermore, many of the possible implementations lend themselves to parallelization with optional load balancing.

Some embodiments of the invention propose advantageous techniques for forming the resource subsets. The resources may be discrete or continuous. For example, an iterative approach is proposed in which the resources which are shared by the greatest number of vehicles are temporarily removed and it is attempted to identify (or define) preliminary resource subsets such that each vehicle shares resources in one preliminary resource subset only. This can be achieved after one or more iterations. The resource subsets may then be formed by uniting each preliminary resource subset with one or more of the temporarily removed resources. Another option is to form a resource subset by uniting two or more preliminary resource subsets (and any temporarily removed resources). This makes sense if, as a result of the partition, the effort of coordinating intersection resources is expected to consume too much of the computational saving achieved in the planning part. It could make sense too if it is expected that the coordination of the intersection resources, when performed separately from the normal planning, will lead to considerably less efficient utilization of the intersection resources.

In some embodiments, the utilization of the intersection resources is coordinated by assigning different priorities to different vehicle clusters. For example, an unconstrained execution of the tree-based planning algorithm for a primary cluster of vehicles and a corresponding first subset of the common resources may be followed by a constrained execution of the tree-based planning algorithm for a secondary cluster of vehicles and a corresponding second subset of the common resources, wherein the constraint implies that the vehicles of the secondary cluster must yield the intersection resources to vehicles of the primary cluster. This sequential planning approach may, as noted, lead to somewhat less efficient utilization of the intersection resources, though this may be acceptable in view of the computational saving achieved in the planning part. The primary vehicle subset may be the one with most vehicles or the one with greatest waiting cost. The waiting cost may increase if the goods transported has high per-unit value and/or is perishable.

The method within the first aspect of the invention is useful for autonomous, semi-autonomous or driver-operated vehicles. An example use case may be a fleet of fully autonomous vehicles. Another example use case is a fleet of public-transport or industrial vehicles which are operated by human drivers but routed in real time by a central planning entity. Determining routing instructions to vehicles is one example of tactical decision-making. In the context of the present disclosure, a tactical decision for a vehicle may have a validity time of the order of 1 s, 10 s, 100 s or even more. A search depth of d units may therefore correspond to a planning horizon of d s, $10d$ s, $100d$ s or more. The method within the first aspect may be applied to a fleet of 2-10 vehicles, a fleet of the order of 10 vehicles, 100 vehicles, 1000 vehicles or more. In at least some of these numerical ranges, the first aspect is computationally advantageous over the prior art or over non-partitioned tree-based planning, or both.

In a second aspect of the invention, a device for performing the above method is provided. The device includes first and second interfaces and programming circuitry. The first interface is configured to receive, for each vehicle, a set of predefined commands and predefined motion constraints. These quantities are given as input data to the motion planning. Further input data to the motion planning may define a mission (utility task) to be carried out may by the vehicles. The second interface is configured to feed commands selected from said predefined commands—the output of the motion planning—to said plurality of vehicles. The processing circuitry is configured to perform the steps of the above method.

On a general level, the second aspect shares the advantages of the first aspect, and it can be embodied with a corresponding degree of technical variation.

The invention further relates to a computer program containing instructions for causing a computer to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

In the present disclosure, a "tree-based planning algorithm" is an algorithm for which the computational load grows at least linearly with the size of the search space, which may be represented as the number of leaves of a tree. The size of the search space, in turn, is proportional to a power of the number of vehicles, or a quantity greater than the number of vehicles. Typically, an execution of a tree-based planning algorithm includes an evaluation of equally sized sequences of the predefined commands; as discussed with reference to FIG. 3, these sequences are in a one-to-one relationship with the leaves of an n-ary tree of a certain depth. The solving of the planning problem does not necessarily rely on a tree search. Rather, the solver to be used for the planning problem can be chosen freely in view of the intended use case. It is foreseen to use, in some embodiments, machine-learning, such as Q-learning approaches.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which:

FIG. 3 is a search tree representing possible sequences of commands to the vehicles;

FIG. 4 shows a device suitable for controlling a plurality of vehicles; and

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
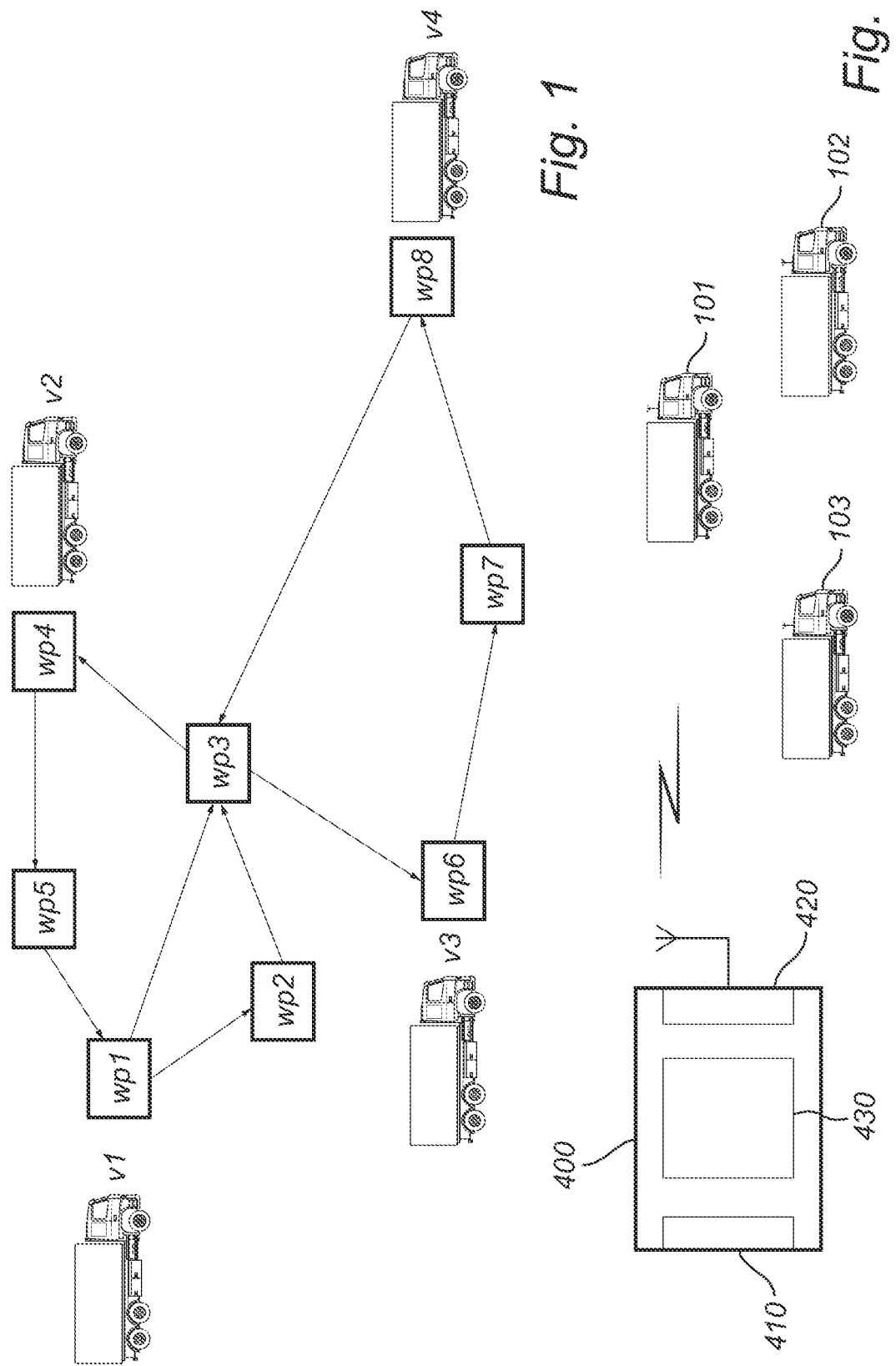
FIG. 1 is a schematical representation of a road network with numbered waypoints.

FIG. 1 is a schematic representation of a road network. Waypoints are defined at the road junctions wp1, wp3 and additionally at some intermediate locations wp2, wp4, wp5, . . . , wp8. Some of the intermediate locations may correspond to so-called absorption nodes, where a visiting vehicle is required to dwell for a predetermined or variable time, for purposes of loading, unloading, maintenance etc. The arrangement of the waypoints is not essential to the present invention, rather their location and number may be chosen as deemed necessary in each use case to achieve smooth and efficient traffic control. The waypoints are treated as common resources which are shared by a plurality of vehicles v1, v2, v3, v4. A resource may be modeled as a logical entity which is either free or occupied by exactly one vehicle at a time. An occupied resource is not consumed but can be released for use by the same or another vehicle. Resources may represent physical space for transport or parking, a communication channel, maintenance machinery, additional equipment for optional temporary use, such as tools or trailers. The resources may include, or consist of, waypoints.

Each vehicle (see FIG. 5) is controllable by an individual control signal, which may indicate a command from a finite set of predetermined commands. A predefined command in this sense may represent an action to be taken at the next waypoint (e.g., continue straight, continue right, continue left, stop), a next destination, a speed adjustment, a loading operation or the like. Implicit signaling is possible in that a command has a different meaning depending on its current state (e.g., toggle between an electric and a combustion engine, toggle between high and low speed, drive/wait at next waypoint). In relation to a predefined communication protocol, implicit signaling may entail that a vehicle interprets the absence of a command to mean that a previously given instruction remains valid. A vehicle which receives no control signal or a neutrally-valued control signal may be configured to continue the previously instructed action or to halt. The predetermined commands preferably relate to tactical decision-making, which corresponds to a time scale typically shorter than strategic decision-making (or navigation) and typically longer than operational (or machine-level) decision-making. Tactical decisions refer to high-level, often discrete, decisions, such as when to change lanes on a highway. Reference is made to J. A. Michon, "A critical view of driver behavior models: What do we know, what should we do?" in L. Evans et al. (eds.), *Human Behavior and Traffic Safety*, Springer, 1985, pages 485-524.

It is finally noted that different vehicles may have different sets of commands.

One aim of the present disclosure is to enable efficient centralized control of the vehicles v1, v2, v3, v4. The vehicles v1, v2, v3, v4 are to be controlled as a group, with mutual coordination. The mutual coordination may entail that any resource utilization conflicts that could arise between vehicles are deferred to a planning algorithm and resolved at the planning stage.

The following description is made under an assumption of discrete time, that is, the traffic system evolves in evenly spaced epochs. The length of an epoch may be of the order of 0.1 s, 1 s, 10 s or longer. At each epoch, either a command a1, a2 may be given to one of the vehicles v1, v2, v3, v4, to one predefined group of vehicles, or no command is given. Quasi-simultaneous commands v1.ν1, v2.ν1 to two vehicles v1, v2 or two vehicle groups can be distributed over two consecutive epochs. To allow approximate simultaneity, the epoch length may be configured shorter than the typical time scale of the tactical decision-making for one vehicle.

With this setup, the space of possible planning outcomes corresponds to the set of all command sequences of length d, where d is the planning horizon (or lookahead horizon). Equivalently, if the planning process is represented as a search tree of the type shown in FIG. 3, the possible planning outcomes are in a one-to-one relationship with the leaves; the corresponding command sequence is the path from the root to this leaf. The search tree comprises seven epochs t1, t2, . . . , t7. The planning horizon is seven times the duration of an epoch. For each epoch, there are five possibilities: no command is given (o), command a1 is given to vehicle v1 (v1.a1), command a2 is given to vehicle v1 (v1.a2), command a1 is given to vehicle v2 (v2.a1) or command a2 is given to vehicle v2 (v2.a2). All five possibilities remain available in the next epoch, whichever possibility is chosen in the present epoch, so that the fan-out of the search tree is 5. An outcome of the planning is a 7-element sequence, like (v1.a1, v2.a2, v2.a2, v2.a2, v2.a2, v2.a2, 0), as suggested in FIG. 3, or (0, 0, 0, 0, 0, 0, 0). Due to the limited drawing space in FIG. 3, repeating parts of the search tree are represented by elliptic dots ( . . . ) or altogether omitted. The leaves of the tree are the nodes at the last epoch t7. Their number is $5^7=78125$.

The number of leaves grows exponentially with the planning horizon. The number of leaves grows as a power of the planning depth d=7 if a further vehicle v3 is added. If the addition implies that one more command v3.a1 can be given at each epoch, there will be $6^d$ leaves; if the addition implies that two more commands v3.a1, v3.a2 per epoch are available, there will be $7^d$ leaves, and so forth. There is clearly a dependence on the number of commands as well. In a hypothetic case where each one of N vehicles is controllable by exactly one command each (e.g., drive/wait), the search tree has $(N+1)^d$ leaves. If the $n^{th}$ vehicle accepts $k_n \geq 1$ commands, the number of leaves for planning depth d is $$\left(1 + \sum_{n=1}^{N} k_n\right)^d.$$

As announced, the search space size is proportional to the $d^{th}$ power of a number which grows at least linearly with the number N of vehicles.

For example, if d=10, N=2 and $k_1=k_2=2$, then the search space size (number of leaves) is about $10^7$, which may be feasible depending on the available computing power. If instead d=10, N=10 and $k_1=k_2=\ldots=k_{10}=2$, the search space size of the order of $10^{13}$, which would be extremely costly to process. It is this rapid growth that the present disclosure addresses.

Within the scope of the present disclosure, a multitude of planning algorithms can be used. A straightforward possible planning approach may be to assign a rule-based score to each possible planning outcome (i.e., sequence of commands) and select the most beneficial one. The score may be assigned on the basis of simulating the movement of the vehicles which will result from applying that sequence of command, e.g., to find their positions at the planning horizon. Other approaches may include heuristics to accelerate the search for an acceptable solution. The heuristics may help identify less promising sequences of commands on an early stage and exclude them from a full evaluation. Machine-learning techniques may be useful. The machine-learning agent (e.g., an artificial neural network) may be trained to propose the most suitable action (i.e., command sequence) for a given state, wherein the state is defined in a cluster-wise fashion. This may mean that the state depends only on the vehicles of one cluster at a time. The partitioning into clusters may be applied in the training phase of the machine learning and in the decision-making phase. Regardless of the choice of planning algorithm, the computational effort generally has a high sensitivity to a change in the number of leaves, which means that the necessary resource allocation varies significantly with the number of vehicles considered in each execution.

Figure 2:
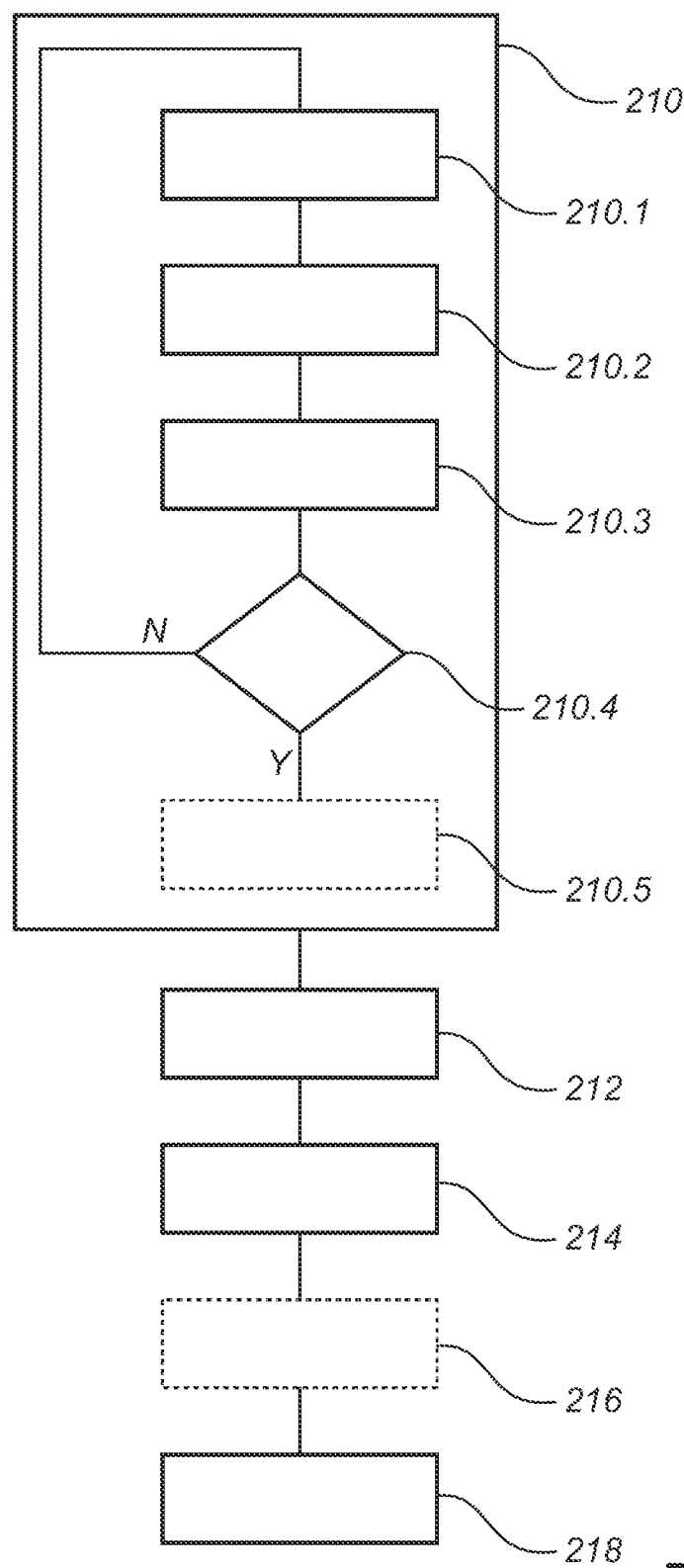
FIG. 2 is a flowchart of a method according to an embodiment.

Embodiments of the invention partition the vehicles v1, v2, v3, v4 into clusters and execute the planning algorithm in a cluster-wise fashion. The partition into clusters is based on a preceding partition of the common resources into subsets on the basis of the individual vehicles' motion constraints. This workflow may correspond to the method 200 illustrated in FIG. 2.

In an initial step 210, the resources wp1, wp2, wp3, wp4, wp5, wp6, wp7, wp8 are considered. It is an aim to form (possibly overlapping) subsets of the resources on the basis of predefined motion constraints of individual ones of the vehicles. The subsets may have the property that each vehicle uses resources only in one subset; all vehicles for which this applies are assigned to a cluster of its own, and the process is repeated for the remaining subsets until all vehicles belong to exactly one cluster. When the resources are waypoints, the subsets shall be such that the vehicles of each cluster are mobile within at most one of the subsets of the waypoint.

In the example of FIG. 1, it is assumed that the vehicles have a preprogrammed behavior which defines a motion constraint such that vehicles v1, v2 move only among the upper five waypoints wp1, wp2, wp3, wp4, wp5 and that vehicles v3, v4 move only among the lower four waypoints wp3, wp6, wp7, wp8. The preprogrammed behavior cannot be overridden by the predefined commands. Alternatively, the motion constraints are defined by each vehicle's navigable space, which may be limited by physical obstacles. Further alternatively, the sheer spacing of some vehicles may imply that they will never share the same common resources, and this is useful as an indication of how the subsets of resources can be formed.

The forming of the subsets can be automated. For example, the initial step 210 may be implemented as a systematic algorithm which initially identifies 210.1 one or more resources which are shared by the greatest number of vehicles; then temporarily removes 210.2 the identified one or more resources from consideration; and then attempts 210.3 to identify two or more preliminary resource subsets such that each vehicle shares resources in one preliminary resource subset only. It is evaluated at point 210.4 whether it is possible to form preliminary resource subsets with the property that each vehicle shares resources in one preliminary resource subset only. Depending on the outcome, the execution of the method 200 may loop back to the identification 210.1 step (N branch). If instead the evaluation 210.4 is successful (Y branch), the subsets can be formed on the basis of the preliminary resource subsets and the temporarily removed resources. The resource subsets may be formed by uniting each preliminary resource subset with one or more of the temporarily removed resources. Another option is to form a resource subset by uniting 210.5 two or more preliminary resource subsets (and any temporarily removed resources). This makes sense if, as a result of the partition, the effort of coordinating intersection resources is expected to consume too much of the computational saving achieved in the planning part. It could make sense as well if it is expected that the coordination of the intersection resources, when performed separately from the planning algorithm, will lead to considerably less efficient utilization of the intersection resources.

In the example illustrated in FIG. 1, waypoint wp3 is the resource which is shared by the greatest number of vehicles (i.e., four) and is therefore identified 210.2 and temporarily removed 210.3 from consideration. It follows, due to the preprogrammed motion constraints of the vehicles, that {wp1, wp2, wp4, wp5} and {wp5, wp6, wp7} are valid preliminary resource subsets, since no vehicle uses resources from both preliminary resource subsets. The fact that all vehicles may move to waypoint wp3 does not change this conclusion, for waypoint wp3 has been removed in step 210.3. Since furthermore no additional improvement seems possible, no further iteration of substeps 210.1, 210.2, 210.3 is necessary. The subsets {wp1, wp2, wp3, wp4, wp5} and {wp3, wp6, wp7, wp8} may thus be formed.

In an imaginable scenario, vehicles v1-v27 share common resources r1-r20 as specified in Table 1:

TABLE 1

| Resource | r1-r9 | r10 | r11-r15 | r16-r17 | r18-r20 |
|---|---|---|---|---|---|
| Shared by | v1-v10 | v1-v20 | v11-v19 | v11-v27 | v20-v27 |
| Number of vehicles | 10 | 20 | 9 | 17 | 8 |

The last row of Table 1 indicates the number of vehicles that share the resource(s) in question. First iteration:

In step 210.1, it is noted that r10 is shared by the largest number of vehicles, whereby, in step 210.2, r10 is temporarily removed from consideration.

In step 210.3, two preliminary resource subsets r1-r9 and r11-r20 are identified. They are valid since no vehicle shares resources in more than one preliminary resource subset.

Since it is considered that the subsets of resources can be improved further, another iteration is executed. Second iteration:

In step 210.1, it is noted that r16-r17 are shared by the largest number of vehicles, whereby, in step 210.2, r16-r17 are temporarily removed from consideration.

In step 210.3, three preliminary resource subsets r1-r9 and r11-r15 and r18-r20 are identified. These three subsets are valid preliminary resource subsets too since no vehicle shares resources in more than one preliminary resource subset.

It is not possible to perform a third iteration; that would mean removing r1-r9 from consideration, and the attempt to identify preliminary resource subsets would fail since vehicles v1-v10 would not be sharing resources in any subset. Therefore, preliminary resource subsets r1-r9 and r11-r15 and r18-r20 are kept. On this basis, as an output of step 210, subsets r1-r10 and r10-r17 and r16-r20 are formed. In step 212, then, a suitable partition of the vehicles can be v1-v10 (cluster 1), v11-v19 (cluster 2) and v20-v27 (cluster 3), respectively. The vehicles in each cluster use resources within at most one of the subsets of the common resources r1-r20.

It is envisioned that in somewhat more complex situations than the two examples discussed, the substeps 210.1, 210.2, 210.3 and the evaluation 210.4 may optionally be followed by a step of uniting 210.5 two or more preliminary resource subsets before forming the subsets resulting from step 210. Such uniting is relevant if the subsets are such that the corresponding vehicle clusters will each include a small number of vehicles, in the sense that some headroom remains to an upper bound on the feasible number of vehicles per cluster for a given search depth. For example, the upper bound may be determined in such manner that the number of leaves for this search depth stays below the available computational capacity. In this situation, when at least some clusters can be allowed to grow somewhat, the uniting of several preliminary resource subsets—whereby the corresponding vehicle clusters will be larger—is likely to lead to more efficient coordination of the resources. Such uniting is especially relevant if the subsets have many nonempty intersections, since the resources in such intersections need dedicated coordination, as discussed below under step 216. It must be recalled, however, that the uniting 210.5 marginally reverses the effort to form subsets and thus partition the vehicles into clusters, and the it may neutralize part of the computational saving that the partitioning achieves. The upper bound on the number of vehicles per cluster must therefore be respected.

In a second step 212 of the method 200, the vehicles are partitioned into disjoint clusters. In the example of FIG. 1, suitable clusters are {v1, v2} and {v3, v4}. In some embodiments, each vehicle remains in the same cluster unless the motion constraints (and thereby, the resource subsets) change.

In a third step 214, multiple computer-implemented executions of a tree-based planning algorithm are initiated. The tree-based planning algorithm may for example be executed on processing circuitry 430 (see FIG. 4). The tree-based planning algorithm may be described as a route planning algorithm or a path planning algorithm. As mentioned above, each execution includes an evaluation of sequences of the predefined commands to be fed to the vehicles in a single cluster and a selection of a preferred sequence of the commands. The executions of the tree-based planning algorithm overlap in time. The executions may even be parallelized and/or assigned to different processing resources. Load balancing, which may be useful in the case of parallel execution, can be achieved by evening out the number of vehicles among the clusters, e.g., by uniting clusters as needed. It is noted that there is generally no need to restrict—in any sense—an execution of the tree-based planning algorithm for a vehicle cluster to the resource subset based on which the vehicle cluster was formed. Rather, the role of the resource subsets in this method is to help identify clusters of vehicles which interact or interfere to a limited extend and for which, therefore, separate planning can achieve an efficiency gain.

In an optional fourth step 216 of the method 200, the vehicles' utilization of any resources belonging to intersections among two or more subsets of the common resources (intersection resources) is coordinated. In the example of FIG. 1, waypoint wp3 is such a resource. The coordination may be achieved in a multitude of ways. For example, a utilization schedule may be set up before the planning algorithm is executed; the utilization schedule may stipulate that the vehicles of a first cluster are allowed to utilize the intersection resources in epochs with even sequence numbers, while the vehicles of a second cluster are allowed to utilize the intersection resources in oddly numbered epochs. The utilization schedule is provided as a constraint to each execution of the planning algorithm.

Alternatively, the coordination 216 of the intersection resources is achieved by assigning different priorities to different vehicle clusters. For example, an unconstrained execution of the tree-based planning algorithm for a primary cluster of vehicles (wherein the primary cluster was formed based on a first subset of the common resources) may be followed by a constrained execution of the tree-based planning algorithm for a secondary cluster of vehicles (wherein the secondary cluster was formed based on a second subset of the common resources). The constraint on the later execution of the planning algorithm implies that the vehicles of the secondary cluster must yield the intersection resources to vehicles of the primary cluster if a conflict arises. Equivalently, the epochs in which the intersection resources are utilized by vehicles of the primary cluster may be provided as a constraint to the later execution of the planning algorithm. The primary vehicle subset may be the one which comprises the larger number of vehicles and/or the one which has highest waiting cost. Clearly, this approach can be used in a cascading fashion, wherein a tertiary cluster shall yield intersection resources to the primary and secondary clusters, and so forth.

In a fifth step 218 of the flow 200, the preferred sequence of commands, which the executions of the tree-based planning algorithm have provided for each cluster, is fed to the vehicles of that cluster. The commands may be supplied using a wireless communication link from a radio access network to each vehicle. Step 218 may consist merely in handing over the preferred sequence of commands to an intermediary, which delivers the commands to the vehicles concerned. As noted initially, the vehicles may be controlled by means of individual vehicle command signals. In such a setup, the example sequence (v1.$a$1, v2.$a$2, v2.$a$2, v2.$a$2, v2.$a$2, v2.$a$2, 0) will be split into one sequence ($a$1, 0, 0, 0, 0, 0, 0) to be given to vehicle v1 and one sequence (0, $a$2, $a$2, $a$2, $a$2, $a$2, 0) to be given, synchronously, to vehicle v2. The vehicle command signals are machine-readable in the case of autonomous vehicles. In embodiments where the method 200 is applied to control a fleet of vehicles which are operated by human drivers but routed in real time by a central planning entity, the commands may be provided either in human-readable form to the drivers (e.g., using traffic signals) or in machine-readable form to the vehicle, which displays the commands in human-readable form inside the cab.

FIG. 4 shows, in accordance with a further embodiment, a device 400 for controlling a plurality of vehicles v1, v2, v3 sharing a set of common resources. The device 400 has a first interface 410 configured to receive, for each vehicle, information representing a set of predefined commands v1.$a$1, v1.$a$2, v2.$a$1, v2.$a$2, which can be fed to the vehicles, and predefined motion constraints. This information may be entered by an operator or provided as configuration data once it is known which vehicles v1, v2, v3 will form the fleet. The device 400 further has a second interface 420 configured to feed commands selected from said predefined commands to said plurality of vehicles and processing circuitry 430 configured to perform the method 200 described above. FIG. 4 shows direct wireless links from the second interface 420 to the vehicles v1, v2, v3. In other embodiments, as explained above, the second interface 420 may instead feed sequences of the predefined commands to another entity, which takes care of the delivery of the commands to the vehicles v1, v2, v3.

Figure 5:
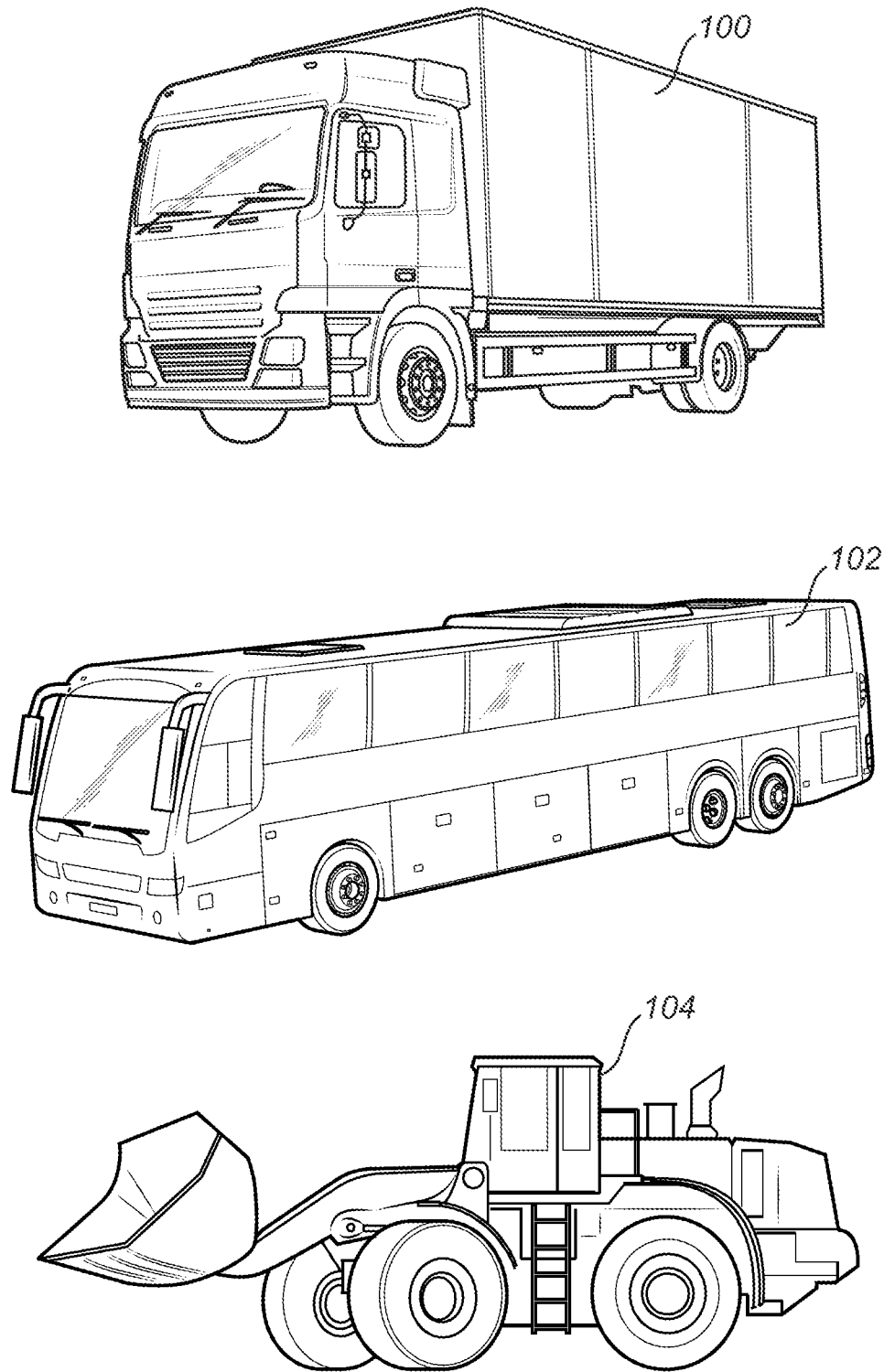
FIG. 5 shows example vehicles that can be controlled centrally and in a group-wise fashion using embodiments of the invention.

FIG. 5 shows a truck 100, a bus 102 and a construction equipment vehicle 104. A fleets of vehicles of one or more of these types, whether they are autonomous or conventional, can be controlled in a centralized fashion using the method 200 or the device 400 described above.

Summing up, the present invention has been spurred by realizing a shortcoming of conventional processing circuitry, namely, that it is poorly suited for executing tree-based planning algorithms. The processing circuitry is oftentimes unable to execute such algorithms efficiently when the number of leaves grows fast as a result of an increasing number of vehicles. Alternatively, the realization can be formulated such that no specialized processing circuitry existed at the time of filing, that could efficiently handle tree-based planning algorithms for a varying number of vehicles. The invention does not pretend to improve on any tree-based planning algorithm as such, only how the processing circuitry can be utilized for executing available planning algorithms more efficiently. As to the proposed solution, the partitioning of the vehicles into clusters is not arbitrary (like in generic parallel computing arrangements) but shall correspond to real-world motion constraints of the individual vehicles.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling a plurality of vehicles sharing a set of common resources representing physical space for transport or parking, wherein each vehicle's motion is controllable by a finite set of predefined commands, the method comprising:

on the basis of predefined motion constraints of individual ones of the vehicles, forming subsets of the common resources, wherein said predefined motion constraints relate to the limits of a respective vehicle's navigable space and wherein the subsets comprises an overlap are allowed to overlap;

on the basis of said subsets, partitioning the vehicles into disjoint clusters, wherein each vehicle remains in the same cluster unless the motion constraints change;

for each of the plurality of clusters, initiating a computer-implemented execution of a tree-based planning algorithm, each execution including an evaluation of sequences of the predefined commands to be fed to the vehicles in a single cluster and a selection of a preferred sequence of the commands, wherein the preferred sequence of the commands contains commands to be given to multiple vehicles in the cluster;

coordinating the vehicles' utilization of any resources in intersections among said non-disjoint subsets of the common resources; and feeding said preferred sequence of commands to the vehicles in each cluster.

2. The method of claim 1, wherein the multiple executions of the tree-based planning algorithm overlap in time.

3. The method of claim 1, wherein the resources include waypoints.

4. The method of claim 3, wherein the vehicles in each cluster are mobile within at most one of the subsets of the common resources.

5. The method of claim 1, wherein said coordinating includes:

initiating an unconstrained execution of the tree-based planning algorithm for a primary cluster of vehicles and a corresponding first subset of the common resources; and initiating a constrained execution of the tree-based planning algorithm for a secondary cluster of vehicles and a corresponding second subset of the common resources, wherein the constraint implies that the vehicles of the secondary cluster must yield resources in the intersection between the first and second subsets to vehicles of the primary cluster.

6. The method of claim 5, further comprising assigning different priorities to different vehicle clusters in accordance with one or more of the following rules:

a primary cluster shall be more numerous than a secondary cluster;

a primary cluster shall have a higher waiting cost than a secondary cluster.

7. The method of claim 1, wherein said forming of subsets includes iterating the following steps:

identifying one or more resources which are shared by the greatest number of vehicles;

temporarily removing the identified one or more resources from consideration; and attempting to identify two or more preliminary resource subsets such that each vehicle shares resources in one preliminary resource subset only, wherein the subsets are formed on the basis of the preliminary resource subsets and the temporarily removed resources.

8. The method of claim 7, wherein said forming of subsets includes: uniting two or more preliminary resource subsets.

9. The method of claim 1, wherein the vehicles are autonomous vehicles.

10. The method of claim 1, wherein the predefined commands correspond to tactical decision-making.

11. A device configured to control a plurality of vehicles sharing a set of common resources representing physical space for transport or parking, the device comprising:

a first interface configured to receive, for each vehicle, a set of predefined commands and predefined motion constraints;

a second interface configured to feed commands selected from said predefined commands to said plurality of vehicles; and processing circuitry configured to perform:

on the basis of predefined motion constraints of individual ones of the vehicles, forming subsets of the common resources, wherein said predefined motion constraints relate to the limits of a respective vehicle's navigable space and wherein the subsets are allowed to overlap;

on the basis of said subsets, partitioning the vehicles into disjoint clusters, wherein each vehicle remains in the same cluster unless the motion constraints change;

for each of the plurality of clusters, initiating a computer-implemented execution of a tree-based planning algorithm, each execution including an evaluation of sequences of the predefined commands to be fed to the vehicles in a single cluster and a selection of a preferred sequence of the commands, wherein the preferred sequence of the commands contains commands to be given to multiple vehicles in the cluster;

coordinating the vehicles' utilization of any resources in intersections among said non-disjoint subsets of the common resources; and feeding said preferred sequence of commands to the vehicles in each cluster.

12. A non-transitory computer readable medium storing a computer program comprising instructions which, when the program is executed by a computer, cause the computer to carry out the method:

on the basis of predefined motion constraints of individual ones of the vehicles, forming subsets of a common resources, the common resources representing physical space for transport or parking, wherein said predefined motion constraints relate to the limits of a respective vehicle's navigable space and wherein the subsets are allowed to overlap;

on the basis of said subsets, partitioning the vehicles into disjoint clusters, wherein each vehicle remains in the same cluster unless the motion constraints change;

for each of the plurality of clusters, initiating a computer-implemented execution of a tree-based planning algorithm, each execution including an evaluation of sequences of the predefined commands to be fed to the vehicles in a single cluster and a selection of a preferred sequence of the commands, wherein the preferred sequence of the commands contains commands to be given to multiple vehicles in the cluster;

coordinating the vehicles' utilization of any resources in intersections among said non-disjoint subsets of the common resources; and feeding said preferred sequence of commands to the vehicles in each cluster.

13. The method of claim 1, wherein the vehicles in a single cluster are to be controlled as a group with mutual coordination.

14. The method of claim 1, wherein the partitioning of the vehicles into disjoint clusters is performed subject to an upper bound on the number of vehicles per cluster.

* * * * *